United States Patent
Chen et al.

(10) Patent No.: US 9,263,943 B2
(45) Date of Patent: Feb. 16, 2016

(54) POWER SUPPLY CIRCUIT AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Huijuan Chen, Beijing (CN); Hyungkyu Kim, Beijing (CN); Wei Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/532,135

(22) Filed: Nov. 4, 2014

(65) Prior Publication Data

US 2015/0326115 A1    Nov. 12, 2015

(30) Foreign Application Priority Data

May 8, 2014    (CN) .......................... 2014 1 0194063

(51) Int. Cl.
  *G05F 3/02* (2006.01)
  *H02M 3/156* (2006.01)
  *G09G 3/36* (2006.01)

(52) U.S. Cl.
  CPC .............. *H02M 3/156* (2013.01); *G09G 3/36* (2013.01); *G09G 2330/026* (2013.01)

(58) Field of Classification Search
  CPC ... H02M 3/156; G09G 3/36; G09G 2230/026; G05F 3/02; H04M 1/00
  See application file for complete search history.

(56) References Cited

U.S. PATENT DOCUMENTS

| 5,278,490 A | 1/1994 | Smedley |
| 2013/0241520 A1* | 9/2013 | Kim ..................... H03K 17/687 323/311 |
| 2014/0117955 A1 | 5/2014 | Zoso et al. |

FOREIGN PATENT DOCUMENTS

| CN | 1613173 A | 5/2005 |
| CN | 101217251 A | 7/2008 |
| JP | 2011109806 A | 6/2011 |
| KR | 20070006308 A | 1/2007 |

OTHER PUBLICATIONS

First Office Action regarding Chinese application No. 201410194063.5, dated Aug. 24, 2015. Translation provided by Dragon Intellectual Property Law Firm.

* cited by examiner

*Primary Examiner* — Michael Faragalla
(74) *Attorney, Agent, or Firm* — Harness, Dickey & Pierce, P.L.C.

(57) ABSTRACT

A power supply circuit and a display device are provided. The power supply circuit includes: a load, a DC power supply; a DC booster circuit; a load feedback circuit configured to generate a converted voltage in accordance with the current passing through the load, integrate the converted voltage to generate an integrated voltage and generate a first triggering signal in accordance with the integrated voltage; and a control circuit configured to generate a second triggering signal in according with the boosted voltage, a DC power supply voltage and a reference voltage, generate a switching signal for controlling the operation of the DC booster circuit in accordance with the first triggering signal and the second triggering signal, and output the switching signal to the DC booster circuit.

17 Claims, 5 Drawing Sheets

POWER SUPPLY CIRCUIT AND DISPLAY DEVICE

CROSS-REFERENCE TO RELATED APPLICATION

This application claims priority to Chinese Patent Application No. 201410194063.5 filed on May 8, 2014, the disclosures of which are incorporated in their entirety by reference herein.

TECHNICAL FIELD

The present disclosure relates to the field of display technology, in particular to a power supply circuit and a display device.

BACKGROUND

FIG. 1 is a typical circuit block diagram of an existing liquid crystal display (LCD), which includes a source driver IC, a gate driver IC, a timing controller (TCON) and a power supply circuit. The power circuit provides operating voltages to the source driver IC, the gate driver IC and the TCON. Usually, the power supply voltage is low, and the operating voltages different from the power supply voltage are required to be applied to the source driver IC, the gate driver IC and the TCON, so it is required to convert, i.e., step up or step down, the applied power supply voltage by the power supply circuit. Generally, a booster circuit is used as the power supply circuit of the LCD so as to step up the power supply voltage, and FIG. 2 is a topological diagram of the booster circuit.

Referring to FIG. 2, the booster circuit includes a DC power supply U0 and a DC booster circuit. The DC booster circuit includes an inductor L, a switch transistor M, a diode D, a capacitor C and a load Rf. The inductor L is connected in series between one input end of the DC power supply U0 and an anode of the diode D. One end of the switch transistor M is connected to the anode of the diode D and the inductor L, and the other end thereof is connected to another input end of the DC power supply U0. The anode of the diode D is connected to the inductor L and the switch transistor M, and a cathode thereof is connected to the capacitor C. The capacitor C is connected in parallel to both ends of the load Rf. Usually, the switch transistor M is a MOSFET.

In the DC booster circuit, a step-up effect is achieved by controlling an on state and an off state of the switch transistor M. When the switch transistor M is turned on, the current passes through the inductor L and the switch transistor M, the energy is accumulated in the inductor L, the current is supplied to the load Rf with a capacitor C, and the diode D is used to cut off a loop circuit through which the capacitor C is discharged via the switch transistor M. When the switch transistor M is turned off, the second diode D is tuned on, and the capacitor C is charged under the effect of counter electromotive forces of the DC power supply U0 and the inductor L. Hence, an output voltage Ui of the DC booster circuit is greater than a DC input voltage U0 of the DC booster circuit, and the DC booster circuit can be used to step up the voltage. Moreover, the output voltage of the DC booster circuit is associated with an ON time, i.e., an operating frequency, of the switch transistor M.

For the power supply circuit of the LCD, there mainly exist the power consumption for turning on the circuit and the power consumption for turning on or off the switch transistor. The former may be reduced via suitable elements, e.g., a diode having relatively low DC resistance, and the latter is generated by the gate capacitor discharge when the MOSFET is turned on or off. When the load is heavy, the power consumption for turning on the circuit constitutes a main portion of the total power consumption, and when the load is light, the power consumption for turning on the circuit decreases, and a ratio of the power consumption for turning on or off the switch transistor to the total power consumption increases. Hence, it is required to reduce the operating frequency of the switch transistor, thereby to maintain the power supply circuit at high operating efficiency.

However, currently the DC booster circuit can merely operate at one operating frequency. An output voltage of the DC booster circuit is a constant value, and the current passing through the load is inversely proportional to the load. Hence, when the load in the power supply circuit changes, the operating efficiency of the power supply circuit will change too, which thus results in a decrease in the operating efficiency of the power supply circuit. Moreover, when the load is changed to be light, the current in the power supply circuit increases, which thus results in the conversion of excessive electric energy to heat and an increase in an overheating risk of the power supply circuit. As a result, a normal operation of the power supply circuit, and even that of the LCD, will be adversely affected.

SUMMARY

An object of the present disclosure is to provide a power supply circuit and a display device, so as to prevent low operating efficiency of the power supply circuit due to a single operating frequency of a DC booster circuit in the prior art, as well as an increase in an overheating risk of the power supply circuit due to a bigger current when a heavy load is changed to a light one.

In one aspect, the present disclosure provides a power supply circuit, including a load, a DC power supply, a DC booster circuit, a load feedback circuit and a control circuit. The DC power supply is configured to output a DC voltage to the DC booster circuit. The DC booster circuit is configured to receive the DC voltage from the DC power supply, boost the DC voltage to obtain a boosted voltage, and output the boosted voltage to the load. The load feedback circuit is configured to receive a current passing through the load, generate a converted voltage in accordance with the current, integrate the converted voltage to generate an integrated voltage, generate a first triggering signal in accordance with the integrated voltage, and output the first triggering signal to the control circuit. The first triggering signal is of a certain period, and its frequency is in direct proportion to the current passing through the load. The control circuit is configured to receive the boosted voltage from the DC booster circuit, generate a second triggering signal in according with the boosted voltage, a DC power supply voltage and a reference voltage, receive the first triggering signal from the load feedback circuit, generate a switching signal for controlling the operation of the DC booster circuit in accordance with the first triggering signal and the second triggering signal, and output the switching signal to the DC booster circuit.

In the power supply circuit, the DC voltage is boosted by the DC booster circuit, and the boosted voltage is supplied to the load for the operation thereof. The current passing through the load is received by the load feedback circuit, the converted voltage is generated in accordance with the current and integrated to generate the integrated voltage, and the first triggering signal is generated in accordance with the integrated voltage and outputted to the control circuit. The first triggering signal is of a certain period, and its frequency is in direct proportion to the current passing through the load. The boosted voltage is received by the control circuit from the DC booster circuit, and the second triggering signal is generated in accordance with the boosted voltage, the DC power supply voltage and the reference voltage. The first triggering signal is received by the control circuit from the load feedback circuit, and the switching signal for controlling the operation of the DC booster circuit is generated in accordance with the first triggering signal and the second triggering signal and then outputted to the DC booster circuit. In the power supply circuit, when the load is changed from a heavy one to a light one, the current passing through the load increases, which thus results in an increase in a frequency of the first triggering signal generated by the load feedback circuit and an increase in a frequency of the switching signal, thereby results in an increase in the boosted voltage from the DC booster circuit. The control circuit receives the increased, boosted voltage from the DC booster circuit, and the second triggering signal outputted in accordance with the increased, boosted voltage, the DC power supply voltage and the reference voltage is a low level signal. At this time, the switching signal from the control circuit is also a low level signal, and the operation of the DC booster circuit is stopped temporarily. Subsequently, the boosted voltage from the DC booster circuit decreases gradually along with the power consumption of the load, the current passing through the load decreases gradually too, and the second triggering signal from the control circuit is changed to be a high level signal. At this time, the control circuit starts to operate under the effect of the second triggering signal, so as to receive the first triggering signal from the load feedback circuit, generate the switching signal and output it to the DC booster circuit. The switching signal is identical to the first triggering signal. Because the current passing through the load decreases, at this time the frequency of the switching signal and the switch power consumption will decrease too, so the operating efficiency of the power supply circuit will be improved. Meanwhile, after the frequency of the switching signal decreases, the boosted voltage from the DC booster circuit and the current passing through the load will decrease too. As a result, it is able to prevent excessive electric energy from being converted to heat due to an increase in the current, thereby to prevent the normal operation of the power supply circuit, and even that of a LCD, from being adversely affected due to an increase in an overheating risk of the power supply circuit.

Alternatively, the load feedback circuit includes a current-to-voltage conversion circuit and a voltage-controlled oscillation circuit. The current-to-voltage conversion circuit is connected in series between the DC booster circuit and the voltage-controlled oscillation circuit, and configured to receive the current passing through the load, generate the converted voltage in accordance with the current, and output the converted voltage to the voltage-controlled oscillation circuit. The voltage-controlled oscillation circuit is connected in series between the current-to-voltage conversion circuit and a switch control circuit, and configured to receive the converted voltage from the current-to-voltage conversion circuit, integrate the converted voltage to generate the integrated voltage, generate the first triggering signal in accordance with the integrated voltage, and output the first triggering signal to the control circuit.

Alternatively, the current-to-voltage conversion circuit includes an operational amplifier, a first resistor, a second resistor and a third resistor. A negative input end of the operational amplifier is connected to the load and the first resistor, a positive input end thereof is connected to the second resistor, and an output end thereof is connected to the third resistor. The first resistor is connected in series between the negative input end and the output end of the operational amplifier. The second resistor is connected in series between the positive input end of the operational amplifier and a grounded end. The third resistor is connected in series between the output end of the operational amplifier and the grounded end.

The current-to-voltage conversion circuit receives the current passing through the load, generates the converted voltage in accordance with the current passing through the load, and outputs the converted voltage to the voltage-controlled oscillation circuit, so that the voltage-controlled oscillation circuit can generate the first triggering signal in accordance with the converted voltage.

Alternatively, the voltage-controlled oscillation circuit includes an integration subcircuit and a hysteresis comparison subcircuit. The integration subcircuit is connected in series between the current-to-voltage conversion circuit and the hysteresis comparison subcircuit, and configured to receive the converted voltage from the current-to-voltage conversion circuit, integrate the converted voltage to generate the integrated voltage, and output the integrated voltage to the hysteresis comparison subcircuit. The hysteresis comparison subcircuit is connected in series between the integration subcircuit and the switch control circuit, and configured to receive the integrated voltage from the integration subcircuit, generate the first triggering signal in accordance with the integrated voltage, and output the first triggering signal to the switch control circuit.

To be specific, the integration subcircuit includes an integrator, a fourth resistor, a fifth resistor and a first capacitor. A negative input end of the integrator is connected to the fourth resistor, a positive input end thereof is connected to the fifth resistor, and an output end thereof is connected to the first capacitor. The fourth resistor is connected in series between the output end of the current-to-voltage conversion circuit and the negative input end of the integrator. The fifth resistor is connected in series between the positive input end of the integrator and the grounded end. The first capacitor is connected in series between the negative input end and the output end of the integrator.

Alternatively, the hysteresis comparison subcircuit includes a hysteresis comparator, a sixth resistor, a seventh resistor, an eighth resistor, a ninth resistor, a voltage-regulator transistor, and a first diode. A positive input end of the hysteresis comparator is connected to the sixth resistor, a negative input end thereof is connected to the ground, and an output end thereof is connected to the seventh resistor. The sixth resistor is connected in series between the output end of the integrator and the positive input end of the hysteresis comparator. The seventh resistor is connected in series between the output end of the hysteresis comparator and a cathode of the voltage-regulator tube. The eighth resistor is connected in series between the sixth resistor and the cathode of the voltage-regulator tube. The ninth resistor is connected in series between the cathode of the voltage-regulator tube and an anode of the first diode. The cathode of the voltage-regulator tube is connected to the seventh resistor, the eighth resistor and the ninth resistor, and an anode thereof is connected to the ground. The anode of the first diode is connected to the ninth resistor, and a cathode thereof is connected to the negative input end of the integrator.

Alternatively, the control circuit includes a trigger control circuit and a switch control circuit. The trigger control circuit is configured to receive the boosted voltage from the DC booster circuit, generate the second triggering signal in accordance with the boosted voltage, the DC power supply voltage and the reference voltage, and output the second triggering signal to the switch control circuit. The switch control circuit is configured to receive the second triggering signal from the trigger control circuit and the first triggering signal from the voltage-controlled oscillating circuit, generate the switching signal for controlling the operation of the DC booster voltage, and outputs the switching signal to the DC booster circuit.

Alternatively, in the switch control circuit, when the second triggering signal is at a high level, the switching signal is identical to the first triggering signal, and when the second triggering signal is at a low level, and the switching signal is a low level signal.

Alternatively, the DC booster circuit includes an inductor, a second diode, a second capacitor, a switch transistor and a tenth resistor. The inductor is connected to the input end of the DC power supply. An anode of the second diode is connected to the inductor, and a cathode thereof is connected to the second capacitor and the load. The second capacitor is connected in series between the cathode of the second diode and the grounded end. The switch transistor is connected in series between the anode of the second diode and the tenth resistor. The tenth resistor is connected in series between the switch transistor and the grounded end.

Alternatively, the trigger control circuit includes an eleventh resistor, a twelfth resistor, an error amplifier, and an amplifier comparator. One end of the eleventh resistor is connected to the cathode of the second diode, the second capacitor and the load, and the other end thereof is connected to the twelfth resistor. The twelfth resistor is connected in series between the eleventh resistor and the grounded end. A positive input end of the error amplifier is connected to a reference voltage input end, a negative input end thereof is connected to the eleventh resistor and the twelfth resistor, and an output end thereof is connected to a negative input end of the amplifier comparator. A positive input end of the amplifier comparator is connected to the tenth resistor and the switch transistor, and the negative input end thereof is connected to the output end of the error amplifier.

Alternatively, the switch control circuit includes a trigger, a first triggering signal input end of which is connected to the output end of the load feedback circuit, a second triggering signal input end of which is connected to the output end of the amplifier comparator, and an output end of which is connected to the switch transistor.

Alternatively, the switch transistor may be an NMOSFET, whose on and off states are controlled so as to control the operation of the DC booster circuit. The boosted voltage from the DC booster circuit is associated with the switching frequency of the switch transistor. In addition, the switch transistor may also be an electromagnetic relay, a TFT, etc.

Alternatively, a gate electrode of the NMOSFET is connected to the output end of the trigger, a drain electrode thereof is connected to the anode of the second diode, and a source electrode thereof is connected to the tenth resistor. When the switching signal is at a high level, the NMOSFET is turned on so as to charge the second capacitor, and when the switching signal is at a low level, the NMOSFET is turned off, so as to discharge the second capacitor.

In another aspect, the present disclosure provides a display device including the above-mentioned power supply circuit.

DETAILED DESCRIPTION

The present disclosure provides a power supply circuit and a display device, so as to prevent low operating efficiency of the power supply circuit due to a single operating frequency of a DC booster circuit in the prior art, as well as an increase in an overheating risk of the power supply circuit due to a bigger current when a heavy load is changed to a light one.

The present disclosure will be described hereinafter in a clear and complete manner in conjunction with the drawings. Obviously, the followings are merely a part of, rather than all of, the embodiments of the present disclosure, and based on these embodiments, a person skilled in the art can, without any creative effort, obtain the other embodiments, which also fall within the scope of the present disclosure.

Figure 1:
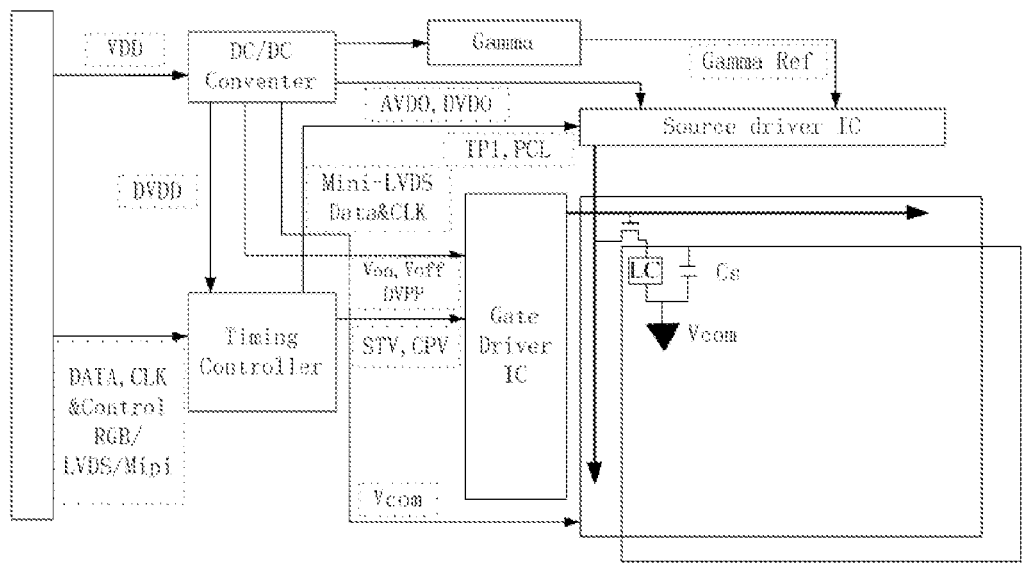
FIG. 1 is a circuit diagram of an existing LCD.
Figure 2:
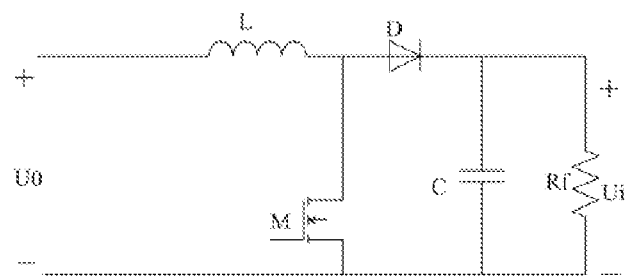
FIG. 2 is a circuit diagram of an existing DC booster circuit.
Figure 3:
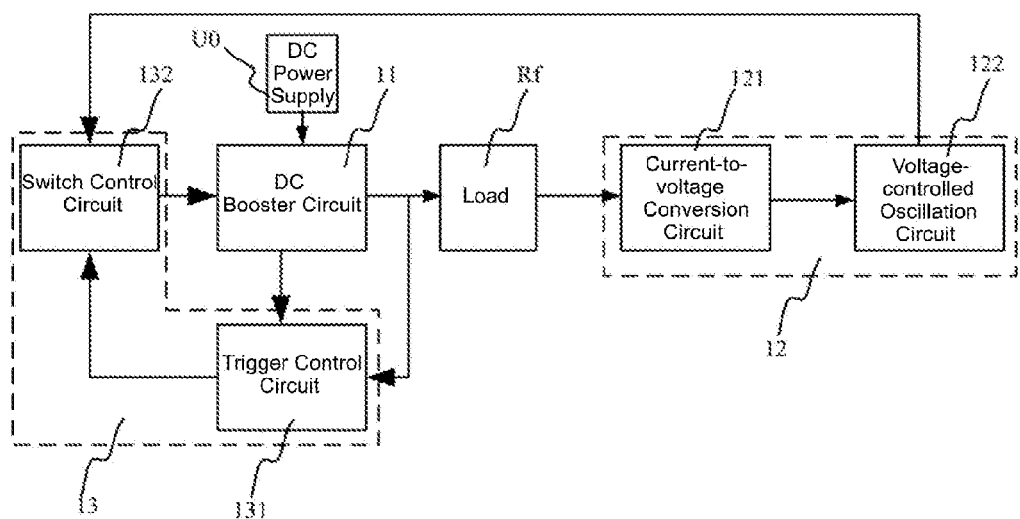
FIG. 3 is a schematic view showing a power supply circuit according to one embodiment of the present disclosure.

Referring to FIG. 3, which is a schematic view showing a power supply circuit according to an embodiment of the present disclosure, the power supply circuit includes a load Rf, a DC power supply U0, a DC booster circuit 11, a load feedback circuit 12 and a control circuit 13.

To be specific, the DC power supply U0 is configured to output a DC voltage to the DC booster circuit 11. The DC booster circuit 11 is configured to receive the DC voltage from the DC power supply, boost the DC voltage to obtain a boosted voltage, and output the boosted voltage to the load Rf. The load feedback circuit 12 is configured to receive a current passing through the load, generate a converted voltage in accordance with the current, integrate the converted voltage to generate an integrated voltage, generate a first triggering signal in accordance with the integrated voltage, and output the first triggering signal to the control circuit. The first triggering signal is of a certain period, and its frequency is in direct proportion to the current passing through the load. The control circuit 13 is configured to receive the boosted voltage from the DC booster circuit, generate a second triggering signal in according with the boosted voltage, a DC power supply voltage and a reference voltage, receive the first triggering signal from the load feedback circuit, generate a switching signal for controlling the operation of the DC booster circuit in accordance with the first triggering signal and the second triggering signal, and output the switching signal to the DC booster circuit.

The load feedback circuit 12 includes a current-to-voltage conversion circuit 121 and a voltage-controlled oscillation circuit 122. To be specific, the current-to-voltage conversion circuit 121 is connected in series between the DC booster circuit 11 and the voltage-controlled oscillation circuit 122, and configured to receive the current passing through the load, generate the converted voltage in accordance with the current, and output the converted voltage to the voltage-controlled oscillation circuit 122. The voltage-controlled oscillation circuit 122 is connected in series between the currentto-voltage conversion circuit 121 and a switch control circuit, and configured to receive the converted voltage from the current-to-voltage conversion circuit 121, integrate the converted voltage to generate the integrated voltage, generate the first triggering signal in accordance with the integrated voltage, and output the first triggering signal to a switch control circuit. The first triggering signal is of a certain period, and its frequency is in direct proportion to the current passing through the load.

The control circuit 13 includes a trigger control circuit 131 and the switch control circuit 132. To be specific, the trigger control circuit 131 is configured to receive the boosted voltage from the DC booster circuit 11, generate the second triggering signal in accordance with the boosted voltage, the DC power supply voltage and the reference voltage, and output the second triggering signal to the switch control circuit 132. The switch control circuit 132 is configured to receive the second triggering signal from the trigger control circuit and the first triggering signal from the voltage-controlled oscillating circuit, generate the switching signal for controlling the operation of the DC booster voltage, and outputs the switching signal to the DC booster circuit.

In the switch control circuit 132, when the second triggering signal is at a high level, the switching signal is identical to the first triggering signal, and when the second triggering signal is at a low level, and the switching signal is a low level signal.

In the power supply circuit according to the embodiment, the DC voltage is boosted by the DC booster circuit, and the boosted voltage is supplied to the load for the operation of the load. The current passing through the load is received by the current-to-voltage conversion circuit connected in series between the DC booster circuit and the voltage-controlled oscillation circuit, and the converted voltage is generated in accordance with the current and outputted to the voltage-controlled oscillation circuit. The converted voltage from the current-to-voltage conversion circuit is received by the voltage-controlled oscillation circuit connected in series between the current-to-voltage conversion circuit and the switch control circuit, and the converted voltage is integrated to generate the integrated voltage. The first triggering signal is generated in accordance with the integrated voltage and outputted to the switch control signal. The first triggering signal is of a certain period, and its frequency is in direct proportion to the current passing through the load. The second triggering signal is generated by the trigger control circuit in accordance with the boosted voltage, the DC power supply voltage and the reference voltage, and outputted to the switch control circuit. The second triggering signal from the trigger control circuit and the first triggering signal from the voltage-controlled oscillation circuit are received by the switch control circuit, and the switching signal for controlling the operation of the DC booster circuit is generated and outputted to the DC booster circuit. In the power supply circuit, when the load is changed from a heavy one to a light one, the current passing through the load increases, which thus results in an increase in a frequency of the first triggering signal generated by the load feedback circuit and an increase in a frequency of the switching signal, thereby results in an increase in the boosted voltage from the DC booster circuit. The trigger control circuit receives the increased, boosted voltage from the DC booster circuit, and the second triggering signal generated in accordance with the increased, boosted voltage, the DC power supply voltage and the reference voltage is a low level signal. At this time, the switching signal generated by the switch control circuit under the effect of the second triggering signal is also a low level signal, and the operation of the DC booster circuit is stopped temporarily. Subsequently, the boosted voltage from the DC booster circuit decreases gradually along with the power consumption of the load, and the current passing through the load gradually decreases too. At this time, the switch control circuit starts to operate under the effect of the second triggering signal, so as to receive the first triggering signal from the voltage-controlled oscillation circuit, generate the switching signal and output it to the DC booster circuit. Because the current passing through the load decreases and the switching signal has a frequency in direct proportion to the current passing through the load, at this time the frequency of the switching signal and the switch power consumption will decrease too, so the operating efficiency of the power supply circuit will be improved. Meanwhile, after the frequency of the switching signal decreases, the boosted voltage from the DC booster circuit and the current passing through the load will decrease too. As a result, it is able to prevent excessive electric energy from being converted to heat due to an increase in the current, thereby to prevent the normal operation of the power supply circuit, and even that of a LCD, from being adversely affected due to an increase in an overheating risk of the power supply circuit.

Figure 4:
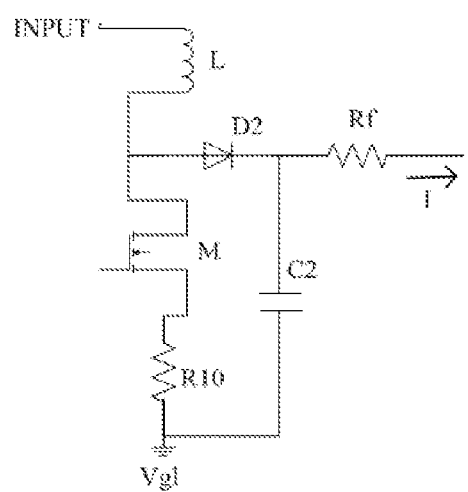
FIG. 4 is a circuit diagram of the DC booster circuit according to one embodiment of the present disclosure.

Referring to FIG. 4, the DC booster circuit 11 includes an inductor L, a second diode D2, a second capacitor C2, a switch transistor M and a tenth resistor R10. To be specific, the inductor L is connected to the input end INPUT of the DC power supply. An anode of the second diode D2 is connected to the inductor L, and a cathode thereof is connected to the second capacitor C2 and the load Rf. The second capacitor C2 is connected in series between the cathode of the second diode D2 and a grounded end Vg1. The switch transistor M is connected in series between the anode of the second diode D2 and the tenth resistor R10. The tenth resistor R10 is connected in series between the switch transistor M and the grounded end Vg1.

In the DC booster circuit 11, the step-up is achieved by controlling an on state and an off state of the switch transistor M. When the switch transistor M is turned on, the current passes through the inductor L, the switch transistor M and the resistor R10, energy is accumulated in the inductor L, the current is supplied to the load Rf by the second capacitor C2, and the second diode D2 is used to cut off a loop circuit through which the second capacitor C2 is discharged via the switch transistor M. When the switch transistor M is turned off, the second diode D2 is tuned on, and the second capacitor C2 is charged under the effect of counter electromotive forces of the DC power supply and the inductor. Hence, an output voltage of the DC booster circuit 11 is greater than the voltage from the DC power supply U0, and the DC booster circuit 11 can be used to boost the voltage. Moreover, the boosted voltage from the DC booster circuit is associated with an ON time, i.e., an operating frequency, of the switch transistor M. Usually, the boosted voltage Ui from the DC booster circuit is in direct proportion to the operating frequency of the switch transistor M.

Figure 5:
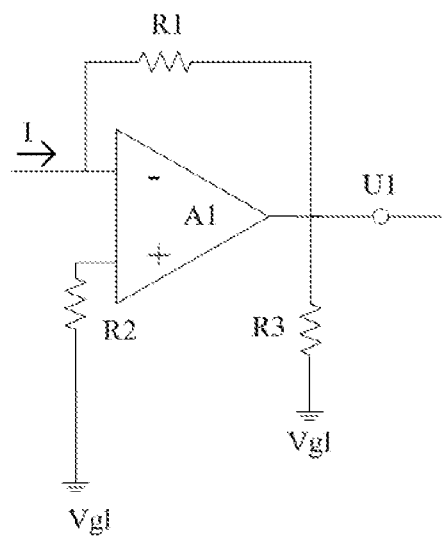
FIG. 5 is a circuit diagram of a current-to-voltage conversion circuit according to one embodiment of the present disclosure.

Referring to FIG. 5, the current-to-voltage conversion circuit 121 includes an operational amplifier A1, a first resistor R1, a second resistor R2 and a third resistor R3. To be specific, a negative input end of the operational amplifier A1 is connected to the load Rf and the first resistor R1, a positive input end thereof is connected to the second resistor R2, and an output end thereof is connected to the third resistor R3. The first resistor R1 is connected in series between the negative input end and the output end of the operational amplifier A1. The second resistor R2 is connected in series between the positive input end of the operational amplifier A1 and the grounded end. The third resistor R3 is connected in series between the output end of the operational amplifier A1 and the grounded end.

The current-to-voltage conversion circuit 121 receives the current I passing through the load Rf, generates the converted voltage U1 in accordance with the current I passing through the load Rf, and outputs the converted voltage U1 to the voltage-controlled oscillation circuit 122, so that the voltage-controlled oscillation circuit 122 may generate the first triggering signal Ds in accordance with the converted voltage U1.

Figure 6:
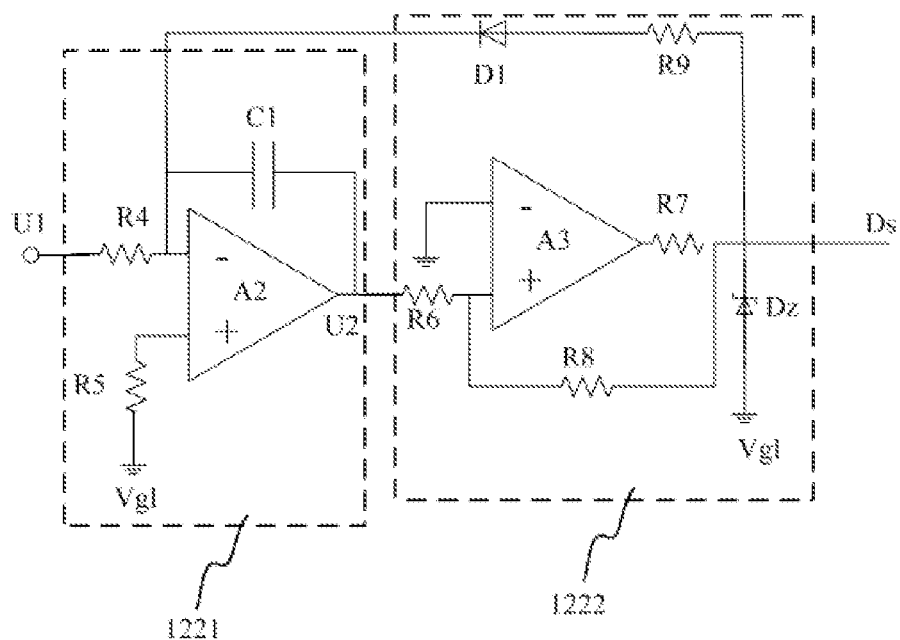
FIG. 6 is a circuit diagram of a voltage-controlled oscillation circuit according to one embodiment of the present disclosure.

Referring to FIG. 6, the voltage-controlled oscillation circuit 122 includes an integration subcircuit 1221 and a hysteresis comparison subcircuit 1222. The integration subcircuit 1221 is connected in series between the current-to-voltage conversion circuit 121 and the hysteresis comparison subcircuit 1222, and configured to receive the converted voltage U1 from the current-to-voltage conversion circuit 121, integrate the converted voltage U1 to generate the integrated voltage U2, and output the integrated voltage U2 to the hysteresis comparison subcircuit 1222. The hysteresis comparison subcircuit 1222 is connected in series between the integration subcircuit 1221 and the switch control circuit 132, and configured to receive the integrated voltage U2 from the integration subcircuit 1221, generate the first triggering signal D2 in accordance with the integrated voltage U2, and output the first triggering signal Ds to the switch control circuit 132.

The integration subcircuit 1221 includes an integrator A2, a fourth resistor R4, a fifth resistor R5 and a first capacitor C1. To be specific, a negative input end of the integrator A2 is connected to the fourth resistor R4, a positive input end thereof is connected to the fifth resistor R5, and an output end thereof is connected to the first capacitor C1. The fourth resistor R4 is connected in series between the output end of the operational amplifier A1 and the negative input end of the integrator A2. The fifth resistor R5 is connected in series between the positive input end of the integrator A2 and the grounded end Vg1. The first capacitor C1 is connected in series between the negative input end and the output end of the integrator A2.

The hysteresis comparison subcircuit 1222 includes a hysteresis comparator A3, a sixth resistor R6, a seventh resistor R7, an eighth resistor R8, a ninth resistor R9, a voltage-regulator tube Dz, and a first diode D1. To be specific, a positive input end of the hysteresis comparator A3 is connected to the sixth resistor R6, a negative input end thereof is connected to the ground, and an output end thereof is connected to the seventh resistor R7. The sixth resistor R6 is connected in series between the output end of the integrator A2 and the positive input end of the hysteresis comparator A3. The seventh resistor R7 is connected in series between the output end of the hysteresis comparator A3 and a cathode of the voltage-regulator tube Dz. The eighth resistor R8 is connected in series between the sixth resistor R6 and the cathode of the voltage-regulator tube Dz. The ninth resistor R9 is connected in series between the cathode of the voltage-regulator tube Dz and an anode of the first diode D1. The cathode of the voltage-regulator tube Dz is connected to the seventh resistor R7, the eighth resistor R8 and the ninth resistor R9, and an anode thereof is connected to the ground. The anode of the first diode D1 is connected to the ninth resistor R9, and a cathode thereof is connected to the negative input end of the integrator A2.

Figure 7:
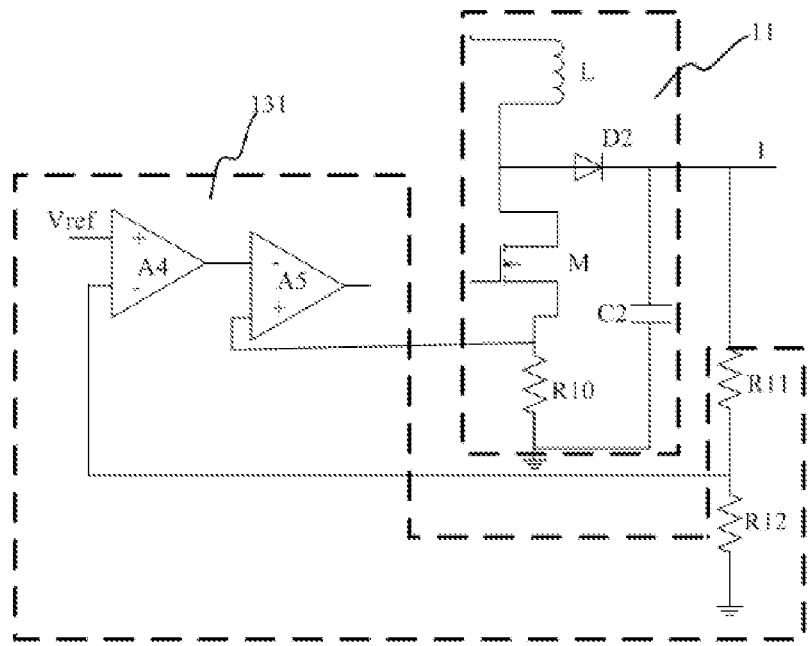
FIG. 7 is a circuit diagram of a trigger control circuit according to one embodiment of the present disclosure.

Referring to FIG. 7, the trigger control circuit 131 includes an eleventh resistor R11, a twelfth resistor R12, an error amplifier A4, and an amplifier comparator A5. To be specific, one end of the eleventh resistor R11 is connected to the cathode of the second diode D2, the second capacitor C2 and the load Rf, and the other end thereof is connected to the twelfth resistor R12. The twelfth resistor R12 is connected in series between the eleventh resistor R11 and the grounded end Vg1. A positive input end of the error amplifier A4 is connected to a reference voltage input end Vref, a negative input end thereof is connected to the eleventh resistor R11 and the twelfth resistor R12, and an output end thereof is connected to a negative input end of the amplifier comparator A5. A positive input end of the amplifier comparator A5 is connected to the tenth resistor R10 and the switch transistor M, and the negative input end thereof is connected to the output end of the error amplifier A4.

Figure 8:
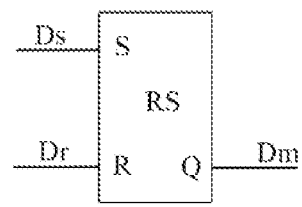
FIG. 8 is a circuit diagram of a switch control circuit according to one embodiment of the present disclosure.

Referring to FIG. 8, the switch control circuit 132 includes a trigger RS, a first triggering signal Ds input end of which is connected to the output end of the load feedback circuit 12, i.e., the cathode of the voltage-regulator tube Dz, a second triggering signal Dr input end of which is connected to the output end of the amplifier comparator A5, and an output end of which is connected to the switch transistor M.

Further, the switch transistor M may be an NMOSFET. To be specific, in the circuit, a gate electrode of the NMOSFET is connected to the output end of the trigger RS, a drain electrode thereof is connected to the anode of the second diode D2, and a source electrode thereof is connected to the tenth resistor R10. When the switching signal Dm from the switch control circuit 132 is at a high level, the NMOSFET is turned on, and the second capacitor C2 is charged by the DC power supply. When the switching signal Dm from the switch control circuit 132 is at a low level, the NMOSFET is turned off, and the second capacitor C2 is discharged.

In the DC booster circuit 11, the on and off states of the switch transistor M is controlled so as to control the operation of the DC booster circuit, and the boosted voltage Ui from the DC booster circuit 11 is associated with the switching frequency of the switch transistor M. In addition, the switch transistor may also be an electromagnetic relay, a TFT, etc.

Figure 9:
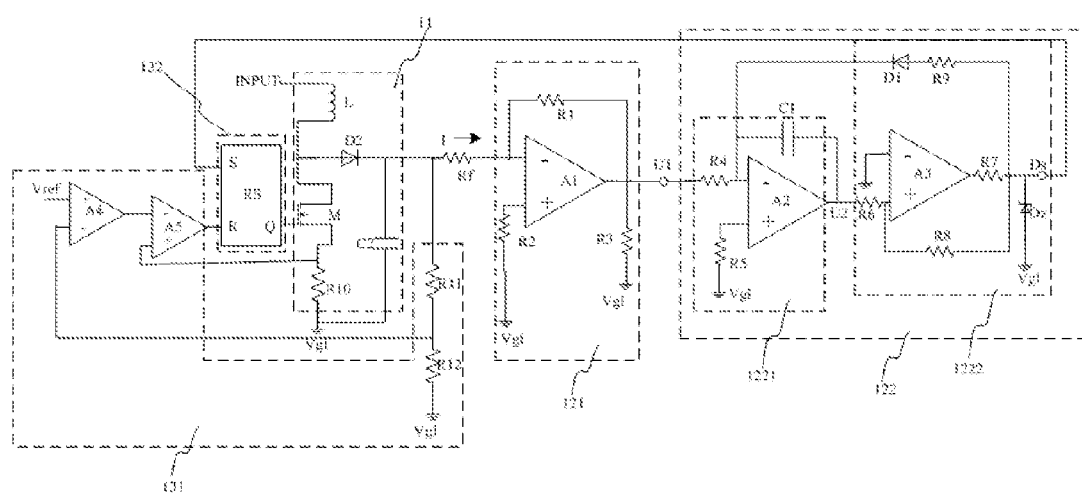
FIG. 9 is a circuit diagram of the power supply circuit according to one embodiment of the present disclosure.

FIG. 9 is a circuit diagram of the power supply circuit according to an embodiment of the present disclosure. The working principle of the power supply circuit will be described hereinafter.

The DC booster circuit 11 receives the DC voltage from the DC power supply U0, and the switch transistor M starts to operate at an initial operating frequency so as to boost the DC voltage from the DC power supply U0 and provide the boosted voltage Ui to the load Rf. To be specific, when the switch transistor M is turned on, the current passes through the inductor L and the switch transistor M, energy is accumulated in the inductor L, the current is supplied to the load Rf by the second capacitor C2, and the second diode D2 is used to cut off a loop circuit through which the second capacitor C2 is discharged via the switch transistor M. When the switch transistor M is turned off, the second diode D2 is tuned on, and the second capacitor C2 is charged under the effect of counter-electromotive forces of the DC power supply U0 and the inductor L, so as to output the boosted voltage Ui. The boosted voltage Ui is greater than the DC voltage from the DC power supply U0.

After the boosted voltage Ui is applied to the load Rf, the current I passes through the load RF and is outputted to the current-to-voltage conversion circuit 121. In the current-to-voltage conversion circuit 121, the negative input end of the operational amplifier A1 is connected to the load Rf, and configured to receive the current I passing through the load Rf, and output the converted voltage U1 via the output end of the operational amplifier A1 to the integration subcircuit 1221. The relationship between the converted voltage U1 and the current I passing through the load Rf is shown as follows:

U1=−I×R1, wherein R1 is connected in series between the negative input end and the output end of the operational amplifier A1, and a signed value of U1 depends on a reference direction of the current I.

The integration subcircuit 1221 receives the converted voltage U1 from the current-to-voltage conversion circuit 121, and the converted voltage U1 is subjected to backward integration by the integrator A2 so as to generate the integrated voltage U2, which is a voltage signal. The integrated voltage U2 increases gradually along with the elapse of time. When the integrated voltage U2 increases to be equal to a threshold voltage UT of the first diode D1 (UT=(Uz×R6)/R8), the hysteresis comparison subcircuit 1222 outputs a voltage signal which is of a value equal to a stable voltage value Uz of the voltage-regulator tube Dz. At this time, the first diode D1 is turned on, the integrated voltage U2 decreases gradually, and the ninth resistor R9 connected in series to the first diode D1 functions as to limit the current. The turn-on resistance of the first diode D1 may be omitted, and the decreasing speed of the integrated voltage U2 depends on R4 and the first capacitor C1. According to the voltage-transfer characteristics of the hysteresis comparator, when U2 is decreased by −UT, the voltage signal from the hysteresis comparison subcircuit 1222 is changed to 0. In the hysteresis comparison subcircuit 1222, the fourth resistor R4 to the ninth resistor R9 mainly function as to limit the current, and their resistances are associated with the characteristics of an actual operational amplifier. The above process is repeated so as to generate the first triggering signals Ds, which are voltage signals distributed in a rectangular form and whose levels, high and low, are equal to the stable voltage value Uz of the voltage-regulator tube Dz and 0, respectively. The first triggering signal Ds is of a frequency f, which may be calculated by the following formula:

$$f = \frac{R8}{2 \times R4 \times R6 \times C1} \times \frac{Uf}{Uz} = \frac{R8}{2 \times R4 \times R6 \times C1} \times \frac{I \times R1}{Uz} = I \times \frac{R8 \times Rf}{R4 \times R6 \times C1 \times Uz}.$$

As can be seen from the above formula, the frequency f of the first triggering signal Ds is in direct proportion to the current I passing through the load Rf.

When the load Rf in the power supply circuit is changed from a heavy one to a light one, the switching frequency of the switch transistor still remains at the initial frequency within a certain period of time, and the boosted voltage Ui is outputted. The current I passing through the load Rf increases under the effect of the boosted voltage Ui, so the frequency f of the first triggering signal Ds will increase too. The frequency of the switching signal Dm generated by the switch control circuit 132 in accordance with the first triggering signal Ds is identical to that of the first triggering signal Ds, so the frequency of the switching signal Dm will increase too. After the frequency of the switching signal Dm increases, the boosted voltage Ui from the DC booster circuit 11 increases, so the voltage applied onto the twelfth resistor R12 increases. The reference voltage Vref is applied to the positive input end of the error amplifier A4, and its value may be set in accordance with the actual circuit. The negative input end of the error amplifier A4 is connected to the twelfth resistor R12. When the voltage applied to the twelfth resistor R12 increases gradually, a voltage difference of the output end of the error amplifier A4 increases gradually too. The negative input end of the amplifier comparator A5 receives the voltage difference from the output end of A4, and the positive input end thereof receives the voltage applied to the tenth resistor. When the voltage difference received by the negative input end of the amplifier comparator A5 is greater than the voltage applied onto the tenth resistor, the second triggering signal Dr from the amplifier comparator A5 is a low level signal. At this time, the switching signal from the trigger Rs is a low level signal, and the switch transistor M is in an off state temporarily. The output voltage Ui from the DC booster circuit decreases gradually along with power consumption of the load, and the current I passing through the load Rf, the frequency of the first triggering signal Ds and the voltage applied to the twelfth resistor R12 decrease too. When the voltage applied onto the twelfth resistor R12 decreases to a certain extent so that the voltage difference from the error amplifier A4 is less than the voltage applied to the tenth resistor R10, the amplifier comparator A5 outputs a high level signal, i.e., the second triggering signal Dr outputted by the trigger control circuit 131 to the switch control circuit is a high level signal. At this time, the switching signal Dm from the output end of the trigger Rs is identical to the first triggering signal Ds. The switch transistor M in the DC booster circuit 11 is driven by the switching signal Dm so as to be periodically turned on, thereby the DC booster circuit 11 starts to be in an operating state to boost the voltage.

The present disclosure further provides a display device including the above-mentioned power supply circuit.

According to the present disclosure, in the power supply circuit, the DC voltage is boosted by the DC booster circuit, and the boosted voltage is supplied to the load for the operation of the load. The current passing through the load is received by the load feedback circuit, the converted voltage is generated in accordance with the current and integrated to generate the integrated voltage, and the first triggering signal is generated in accordance with the integrated voltage and outputted to the control circuit. The first triggering signal is of a certain period, and its frequency is in direct proportion to the current passing through the load. The boosted voltage is received by the control circuit from the DC booster circuit, and the second triggering signal is generated in accordance with the boosted voltage, the DC power supply voltage and the reference voltage. The first triggering signal is received by the control circuit from the load feedback circuit, and the switching signal for controlling the operation of the DC booster circuit is generated in accordance with the first triggering signal and the second triggering signal and then outputted to the DC booster circuit. In the power supply circuit, when the load is changed from a heavy one to a light one, the current passing through the load increases, which thus results in an increase in a frequency of the first triggering signal generated by the load feedback circuit and an increase in a frequency of the switching signal, thereby results in an increase in the boosted voltage from the DC booster circuit. The control circuit receives the increased, boosted voltage from the DC booster circuit, and the second triggering signal outputted in accordance with the increased, boosted voltage, the DC power supply voltage and the reference voltage is a low level signal. At this time, the switching signal from the control circuit is also a low level signal, and the operation of the DC booster circuit is stopped temporarily. Subsequently, the boosted voltage from the DC booster circuit decreases gradually along with the power consumption of the load, the current passing through the load decreases gradually too, and the second triggering signal from the control circuit is changed to be a high level signal. At this time, the control circuit starts to operate under the effect of the second triggering signal, so as to receive the first triggering signal from the load feedback circuit, generate the switching signal and output it to the DC booster circuit. The switching signal is identical to the first triggering signal. Because the current passing through the load decreases, at this time the frequency of the switching signal and the switch power consumption decrease too, so the operating efficiency of the power supply circuit is improved. Meanwhile, after the frequency of the switching signal decreases, the boosted voltage from the DC booster circuit and the current passing through the load decrease too. As a result, it is able to prevent excessive electric energy from being converted to heat due to an increase in the current, thereby to prevent the normal operation of the power supply circuit, and even that of a LCD, from being adversely affected due to an increase in an overheating risk of the power supply circuit.

Obviously, a person skilled in the art may make further modifications and improvements without departing from the spirit and scope of the present disclosure. If these modifications and improvements fall within the scope of the appended claims and the equivalents thereof, the present disclosure also intends to include them.

What is claimed is:

1. A power supply circuit comprising a load, a DC power supply, a DC booster circuit, a load feedback circuit and a control circuit, wherein
   the DC power supply is configured to output a DC voltage to the DC booster circuit;
   the DC booster circuit is configured to receive the DC voltage from the DC power supply, boost the DC voltage to obtain a boosted voltage, and output the boosted voltage to the load;
   the load feedback circuit is configured to receive a current passing through the load, generate a converted voltage in accordance with the current, integrate the converted voltage to generate an integrated voltage, generate a first triggering signal in accordance with the integrated voltage, and output the first triggering signal to the control circuit, wherein the first triggering signal is of a certain period, and its frequency is in direct proportion to the current passing through the load; and
   the control circuit is configured to receive the boosted voltage from the DC booster circuit, generate a second triggering signal in according with the boosted voltage, a DC power supply voltage and a reference voltage, receive the first triggering signal from the load feedback circuit, generate a switching signal for controlling the operation of the DC booster circuit in accordance with the first triggering signal and the second triggering signal, and output the switching signal to the DC booster circuit.

2. The power supply circuit according to claim 1, wherein the load feedback circuit includes a current-to-voltage conversion circuit and a voltage-controlled oscillation circuit, wherein
   the current-to-voltage conversion circuit is connected in series between the DC booster circuit and the voltage-controlled oscillation circuit, and configured to receive the current passing through the load, generate the converted voltage in accordance with the current, and output the converted voltage to the voltage-controlled oscillation circuit; and
   the voltage-controlled oscillation circuit is connected in series between the current-to-voltage conversion circuit and a switch control circuit, and configured to receive the converted voltage from the current-to-voltage conversion circuit, integrate the converted voltage to generate the integrated voltage, generate the first triggering signal in accordance with the integrated voltage, and output the first triggering signal to the control circuit.

3. The power supply circuit according to claim 2, wherein the current-to-voltage conversion circuit comprises an operational amplifier, a first resistor, a second resistor and a third resistor, wherein
   a negative input end of the operational amplifier is connected to the load and the first resistor, a positive input end of the operational amplifier is connected to the second resistor, and an output end of the operational amplifier is connected to the third resistor;
   the first resistor is connected in series between the negative input end and the output end of the operational amplifier;
   the second resistor is connected in series between the positive input end of the operational amplifier and a grounded end; and
   the third resistor is connected in series between the output end of the operational amplifier and the grounded end.

4. The power supply circuit according to claim 2, wherein the voltage-controlled oscillation circuit includes an integration subcircuit and a hysteresis comparison subcircuit, wherein
   the integration subcircuit is connected in series between the current-to-voltage conversion circuit and the hysteresis comparison subcircuit, and configured to receive the converted voltage from the current-to-voltage conversion circuit, integrate the converted voltage to generate the integrated voltage, and output the integrated voltage to the hysteresis comparison subcircuit; and
   the hysteresis comparison subcircuit is connected in series between the integration subcircuit and the switch control circuit, and configured to receive the integrated voltage from the integration subcircuit, generate the first triggering signal in accordance with the integrated voltage, and output the first triggering signal to the switch control circuit.

5. The power supply circuit according to claim 4, wherein the integration subcircuit comprises an integrator, a fourth resistor, a fifth resistor and a first capacitor, wherein
   a negative input end of the integrator is connected to the fourth resistor, a positive input end of the integrator is connected to the fifth resistor, and an output end of the integrator is connected to the first capacitor;
   the fourth resistor is connected in series between the output end of the current-to-voltage conversion circuit and the negative input end of the integrator;
   the fifth resistor is connected in series between the positive input end of the integrator and the grounded end; and
   the first capacitor is connected in series between the negative input end and the output end of the integrator.

6. The power supply circuit according to claim 5, wherein the hysteresis comparison subcircuit comprises a hysteresis comparator, a sixth resistor, a seventh resistor, an eighth resistor, a ninth resistor, a voltage-regulator tube, and a first diode, wherein
   a positive input end of the hysteresis comparator is connected to the sixth resistor, a negative input end of the hysteresis comparator is connected to the ground, and an output end of the hysteresis comparator is connected to the seventh resistor;
   the sixth resistor is connected in series between the output end of the integrator and the positive input end of the hysteresis comparator;
   the seventh resistor is connected in series between the output end of the hysteresis comparator and a cathode of the voltage-regulator tube;

the eighth resistor is connected in series between the sixth resistor and the cathode of the voltage-regulator tube;

the ninth resistor is connected in series between the cathode of the voltage-regulator tube and an anode of the first diode;

the cathode of the voltage-regulator tube is connected to the seventh resistor, the eighth resistor and the ninth resistor, and an anode of the voltage-regulator tube is connected to the ground; and the anode of the first diode is connected to the ninth resistor, and a cathode of the first diode is connected to the negative input end of the integrator.

7. The power supply circuit according to claim 1, wherein the control circuit comprises a trigger control circuit and a switch control circuit, wherein the trigger control circuit is configured to receive the boosted voltage from the DC booster circuit, generate the second triggering signal in accordance with the boosted voltage, the DC power supply voltage and the reference voltage, and output the second triggering signal to the switch control circuit; and the switch control circuit is configured to receive the second triggering signal from the trigger control circuit and the first triggering signal from the voltage-controlled oscillating circuit, generate the switching signal for controlling the operation of the DC booster voltage, and outputs the switching signal to the DC booster circuit.

8. The power supply circuit according to claim 7, wherein in the switch control circuit, when the second triggering signal is at a high level, the switching signal is identical to the first triggering signal, and when the second triggering signal is at a low level, and the switching signal is a low level signal.

9. The power supply circuit according to claim 7, wherein the DC booster circuit comprises an inductor, a second diode, a second capacitor, a switch transistor and a tenth resistor, wherein the inductor is connected to the input end of the DC power supply;

an anode of the second diode is connected to the inductor, and a cathode of the second diode is connected to the second capacitor and the load;

the second capacitor is connected in series between the cathode of the second diode and the grounded end;

the switch transistor is connected in series between the anode of the second diode and the tenth resistor; and the tenth resistor is connected in series between the switch transistor and the grounded end.

10. The power supply circuit according to claim 7, wherein the trigger control circuit comprises an eleventh resistor, a twelfth resistor, an error amplifier, and an amplifier comparator, wherein one end of the eleventh resistor is connected to the cathode of the second diode, the second capacitor and the load, and the other end of the eleventh resistor is connected to the twelfth resistor;

the twelfth resistor is connected in series between the eleventh resistor and the grounded end;

a positive input end of the error amplifier is connected to a reference voltage input end, a negative input end of the error amplifier is connected to the eleventh resistor and the twelfth resistor, and an output end of the error amplifier is connected to a negative input end of the amplifier comparator; and a positive input end of the amplifier comparator is connected to the tenth resistor and the switch transistor, and the negative input end of the amplifier comparator is connected to the output end of the error amplifier.

11. The power supply circuit according to claim 10, wherein the switch control circuit comprises a trigger, a first triggering signal input end of the trigger is connected to the output end of the load feedback circuit, a second triggering signal input end of the trigger is connected to the output end of the amplifier comparator, and an output end of the trigger is connected to the switch transistor.

12. The power supply circuit according to claim 11, wherein the switch transistor may be an NMOSFET.

13. The power supply circuit according to claim 12, wherein a gate electrode of the NMOSFET is connected to the output end of the trigger, a drain electrode of the NMOSFET is connected to the anode of the second diode, and a source electrode of the NMOSFET is connected to the tenth resistor.

14. The power supply circuit according to claim 11, wherein the switch transistor is an electromagnetic relay or a TFT.

15. The power supply circuit according to claim 1, wherein the DC booster circuit comprises an inductor, a second diode, a second capacitor, a switch transistor and a tenth resistor, wherein the inductor is connected to the input end of the DC power supply;

an anode of the second diode is connected to the inductor, and a cathode of the second diode is connected to the second capacitor and the load;

the second capacitor is connected in series between the cathode of the second diode and the grounded end;

the switch transistor is connected in series between the anode of the second diode and the tenth resistor; and the tenth resistor is connected in series between the switch transistor and the grounded end.

16. The power supply circuit according to claim 15, wherein the boosted voltage from the DC booster circuit is in direct proportion to the operating frequency of the switch transistor.

17. A display device comprising the power supply circuit according to claim 1.

* * * * *